United States Patent
Nauerz et al.

(10) Patent No.: US 10,146,800 B2
(45) Date of Patent: *Dec. 4, 2018

(54) MANAGEMENT AND DYNAMIC ASSEMBLY OF PRESENTATION MATERIAL

(71) Applicant: International Business Machines Corporation, Armonk, NY (US)

(72) Inventors: Andreas Nauerz, Stuttgart (DE); Jaspreet Singh, Delhi (IN); Isabell Sippli, Metzingen (DE); Martin Welsch, Herrenberg (DE)

(73) Assignee: International Business Machines Corporation, Armonk, NY (US)

(*) Notice: Subject to any disclaimer, the term of this patent is extended or adjusted under 35 U.S.C. 154(b) by 208 days.

This patent is subject to a terminal disclaimer.

(21) Appl. No.: 14/681,216

(22) Filed: Apr. 8, 2015

(65) Prior Publication Data
US 2016/0103575 A1 Apr. 14, 2016

Related U.S. Application Data

(63) Continuation of application No. 14/510,624, filed on Oct. 9, 2014.

(51) Int. Cl.
*G06F 17/30* (2006.01)
*G06F 17/21* (2006.01)
*G06F 17/27* (2006.01)

(52) U.S. Cl.
CPC ...... *G06F 17/30268* (2013.01); *G06F 17/212* (2013.01); *G06F 17/2785* (2013.01); *G06F 17/30265* (2013.01); *G06F 17/30277* (2013.01); *G06F 17/30554* (2013.01); *G06F 17/30864* (2013.01)

(58) Field of Classification Search
CPC .................. G06F 3/0484; G06F 17/30864
USPC ....................................... 707/706
See application file for complete search history.

(56) References Cited

U.S. PATENT DOCUMENTS

| 7,590,939 | B2 | 9/2009 | Sareen et al. |
| 2003/0222890 | A1 | 12/2003 | Salesin et al. |
| 2007/0277106 | A1* | 11/2007 | Takriti .............. G06F 17/30011 715/723 |

(Continued)

OTHER PUBLICATIONS

IBM: List of IBM Patents or Patent Applications Treated as Related (Appendix P), dated Apr. 15, 2015.

(Continued)

*Primary Examiner* — Kimberly Wilson
(74) *Attorney, Agent, or Firm* — Patricia B. Feighan

(57) ABSTRACT

A method for automatically managing a plurality of slides associated with a slide-deck is provided. The method may include adding the plurality of slides to a computing system. The method may also include analyzing at least one slide within the plurality of slides. The method may further include generating a list including at least one key word or at least one tag based on the analyzing. The method may include matching the at least one key word or the at least one tag against at least one key word or at least one tag saved on a presentation server. The method may also include fetching at least one slide or at least one slide-deck from the presentation server based on the matching. The method may further include displaying the at least one fetched slide or the at least one fetched slide-deck on a user interface.

5 Claims, 8 Drawing Sheets

(56) References Cited

U.S. PATENT DOCUMENTS

| | | | |
|---|---|---|---|
| 2008/0040340 A1 | 2/2008 | Varadarajan et al. | |
| 2008/0177782 A1* | 7/2008 | Poston | G06F 17/2288 |
| 2008/0270344 A1* | 10/2008 | Yurick | G06F 17/30026 |
| 2010/0114991 A1* | 5/2010 | Chaudhary | G06F 17/3002 |
| | | | 707/809 |
| 2011/0022960 A1* | 1/2011 | Glover | G06Q 10/10 |
| | | | 715/732 |
| 2013/0346909 A1* | 12/2013 | Advani | G06F 8/33 |
| | | | 715/781 |
| 2015/0006497 A1 | 1/2015 | Chetzroni | |
| 2015/0067026 A1* | 3/2015 | Christiansen | H04L 12/1831 |
| | | | 709/203 |

OTHER PUBLICATIONS

U.S. Appl. No. 14/510,624, filed Oct. 9, 2014, entitled: "Management and Dynamic Assembly of Presentation Material".
"Presentation Management made easy . . . ", http://www.slidebank.com/, accessed on Jul. 19, 2014, 1 page.
"PresentationMANAGER", http://www.presentationpro.com/presentation_manager.aspx, accessed on Jul. 19, 2014, pp. 1-4.
Pending U.S. Appl. No. 14/510,624, filed Oct. 19, 2014, entitled, "Management and Dynamic Assembly of Presentation Material".
O'Neill et al., "Cordovan SlideSorter," Cordovan Digital, 2008, 2 Pages.

\* cited by examiner

MANAGEMENT AND DYNAMIC ASSEMBLY OF PRESENTATION MATERIAL

BACKGROUND

The present invention relates generally to the field of computing, and more particularly to presentations.

Presentations may be used to educate and teach colleagues, students, and customers, in order to explain core concepts and to often sell ideas, visions or products. As such, presentations have become a key task and key competency. For example, employees of many companies may invest a large amount of time in creating (and iteratively refining), often slide-based, presentations. Therefore, over time, people may generate a large collection of presentation material. As such, hundreds or even thousands of presentation files, each comprised of dozens of single slides, may occupy their hard drives.

SUMMARY

According to one embodiment, a method for automatically managing a plurality of slides associated with a slide-deck is provided. The method may include adding the plurality of slides to a computing system. The method may also include analyzing, by a slide analyzer, at least one slide within the plurality of slides. The method may further include generating, by the slide analyzer, a list including at least one key word or at least one tag based on the analyzing of the at least one slide within the plurality of slides, whereby the generated list is associated with the at least one slide or at least one slide-deck. The method may include matching, by a slide composer, the at least one key word or the at least one tag against at least one key word or at least one tag saved on a presentation server. The method may also include fetching, by a search engine, at least one slide or at least one slide-deck from the presentation server based on the matching. The method may further include displaying, by a recommendation generator, the at least one fetched slide or the at least one fetched slide-deck on a user interface.

According to another embodiment, a computer system automatically managing a plurality of slides associated with a slide-deck is provided. The computer system may include one or more processors, one or more computer-readable memories, one or more computer-readable tangible storage medium, and program instructions stored on at least one of the one or more tangible storage medium for execution by at least one of the one or more processors via at least one of the one or more memories, wherebyin the computer system is capable of performing a method. The method may include adding the plurality of slides to a computing system. The method may also include analyzing, by a slide analyzer, at least one slide within the plurality of slides. The method may further include generating, by the slide analyzer, a list including at least one key word or at least one tag based on the analyzing of the at least one slide within the plurality of slides, whereby the generated list is associated with the at least one slide or at least one slide-deck. The method may include matching, by a slide composer, the at least one key word or the at least one tag against at least one key word or at least one tag saved on a presentation server. The method may also include fetching, by a search engine, at least one slide or at least one slide-deck from the presentation server based on the matching. The method may further include displaying, by a recommendation generator, the at least one fetched slide or the at least one fetched slide-deck on a user interface.

According to yet another embodiment, a computer program product for automatically managing a plurality of slides associated with a slide-deck is provided. The computer program product may include one or more computer-readable tangible storage medium and program instructions stored on at least one of the one or more tangible storage medium, the program instructions executable by a processor. The computer program product may include program instructions to add the plurality of slides to a computing system. The computer program product may also include program instructions to analyze, by a slide analyzer, at least one slide within the plurality of slides. The computer program product may further include program instructions to generate, by the slide analyzer, a list including at least one key word or at least one tag based on the analyzing of the at least one slide within the plurality of slides, whereby the generated list is associated with the at least one slide or at least one slide-deck. The computer program product may include program instructions to match, by a slide composer, the at least one key word or the at least one tag against at least one key word or at least one tag saved on a presentation server. The computer program product may also include program instructions to fetch, by a search engine, at least one slide or at least one slide-deck from the presentation server based on the matching. The computer program product may further include program instructions to display, by a recommendation generator, the at least one fetched slide or the at least one fetched slide-deck on a user interface.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
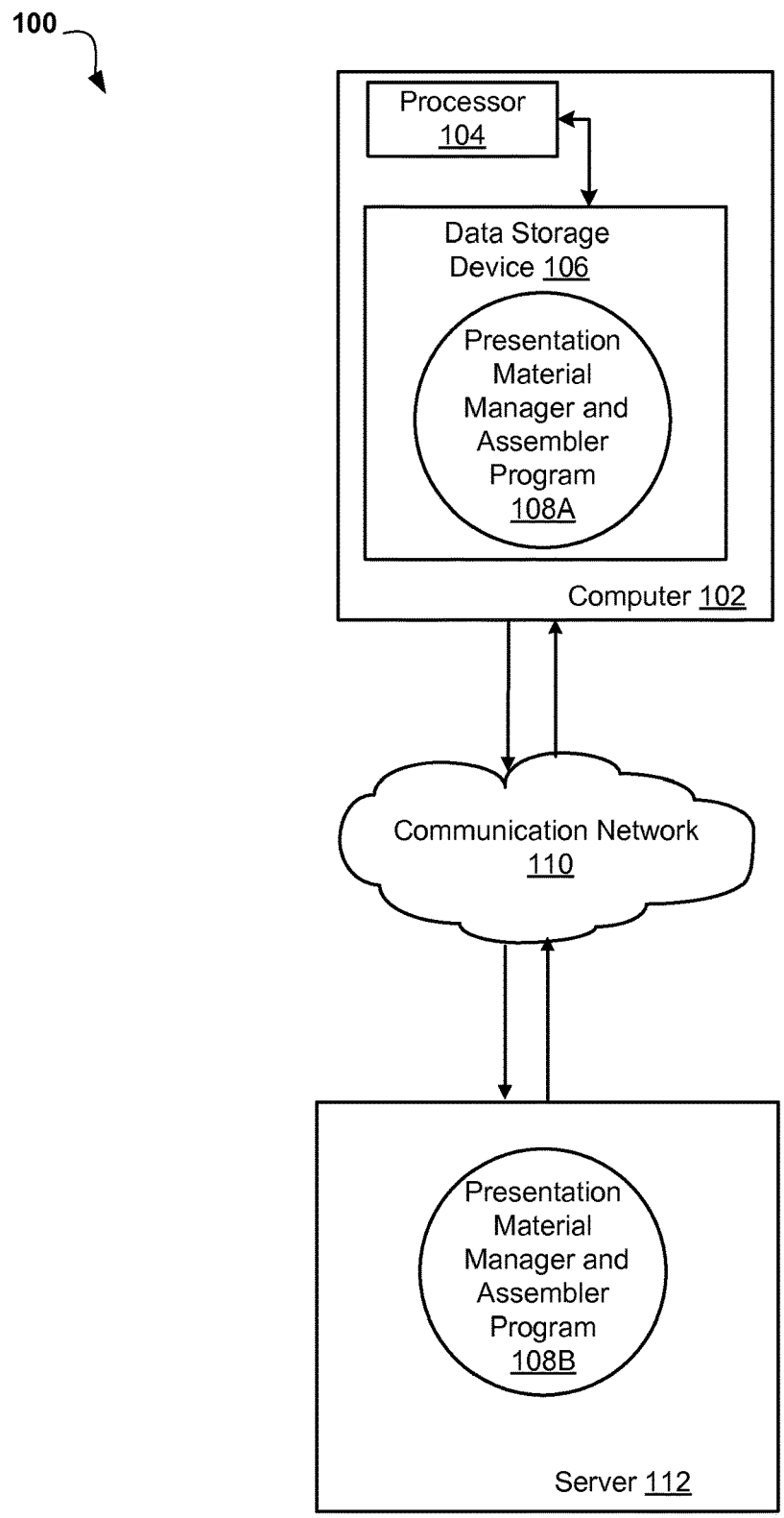
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate to the field of computing, and more particularly to presentations. The following described exemplary embodiments provide a system, method and program product to, among other things, provide management and dynamic assembly of presentation material.

As previously described, presentations may be used to educate and teach others in order to explain core concepts and to often sell ideas, visions or products. Over time, people may generate a large collection of presentation material. As such, hundreds or even thousands of presentation files, each comprised of dozens of single slides, may occupy their hard drives. However, many presentations may be similar, especially since multiple versions of single presentations that contain only minor refinements, may be created and saved over and over again. As such, people may lose control over the tremendous amount of presentations and slides they have generated over time. Finding the right presentation for a particular upcoming event may even become a tedious task. Furthermore, in many situations, employees may be required to assemble the perfect-suited slide-deck for an upcoming event or speech by choosing the right slides from the large repertoire of slides already available to them. However, searching for the right slides from such a large repertoire may become an unbelievable time consuming and frustrating task. Therefore, it may be advantageous, among other things, to be able to manage and dynamically assemble presentation material.

According to at least one embodiment, topic-centric slide-decks may be semi-automatically assembled by selecting the right set of slides from the material being available. The present embodiment may enrich the material (e.g., the case slides) being available with lightweight semantics. As such, according to one implementation, entire slide-decks may be manually categorized and then the slides may be manually categorized. Next, the slide-decks may be categorized according to version and then the slides may be categorized according to version. Then the present embodiment may automatically categorize slide-decks (especially for those slide-decks not previously manually categorized) and automatically categorize slides (especially for those slides not previously manually categorized). The present embodiment may provide a tool that automatically analyzes slides, annotates them, and provides recommendations for slides to be considered related and "versions of each other". Additionally, a central storage (i.e., a "presentation server") may be provided that maintains versions of annotated slides (and allows for enhanced collaboration among a community of users). Furthermore, a tool may be provided that relies on the lightweight semantics that have been added for easily and quickly searching through the pool of slides and slide-decks. The present embodiment may also provide a tool for easily assembling a new slide-deck out of a set of slides that have been found and selected with the help of the tool that automatically analyzes the slides, annotates the slides, and provides recommendations for the slides as previously described.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product to provide management and dynamic assembly of presentation material. According to at least one implementation, slide-decks and single slides may be tagged and versioned. As such, tagging may serve as the main vehicle to categorize the material. Tags may either be assigned manually (e.g., social tagging) or automatically by letting the material be analyzed via natural language processing (NLP) tools that extract keywords.

Additionally, the present embodiment may include a tool used to automate the categorization process previously described. Such an automated tool may be helpful to overcome cold-start problems and to assist a user in getting started. For example, a number of presentations may be loaded into the tool and the tool may analyze all the slides using a technique, such as natural language processing (NLP). Then, the tool may compare the slides. According to one implementation, slides being considered similar may be presented to the end-user. As such, the end-user may then decide whether the slides are versions of each other or not.

Furthermore, the entire set of material (entire presentations, single slides, versions of the slides, annotations, tags, etc.) may be stored on a central server so that users may work with the material locally on their own device. As such, synchronization mechanisms between the user's local device and the central storage on the server may be utilized. In one implementation, the synchronization mechanisms may be similar to mechanisms being used in the version control systems. The synchronization mechanisms may allow for enhanced collaboration between users of a community. For example, user A might be provided with access to slides or versions of slides of user B etc. As such, the present embodiment may allow for the sharing of functions that allow multiple employees to annotate slides and slide-decks foe events that may not be owned by the user themselves. Also, the present embodiment may allow for the sharing of functions that allow employees to search through the slides of teammates or the sharing of functions that allow employees to assemble slide-decks by using material of others as well as their own. Furthermore, multiple presentations may reference the same "physical" slides (or versions of slides) and the slides may be added to a presentation in "fixed mode" (e.g., slides never change even though the referenced slide changes) or in "update mode" (e.g., slides always change to the latest available version).

The present embodiment may also include a tool to provide an aggregated view to the tag space and allow employees that try to assemble slide-decks to access slides associated with tags (e.g., topics). As such, according to one implementation, such a tool may display tags in a tag-cloud fashion. Therefore, clicking on a tag (or multiple tags in case a user may want to shrink down the set of potential results) may reveal a list of matching slides (or slide-decks), preferably being displayed in a list containing thumbnails. Then, slides and versions of the same slide may be easily comparable via a "diff viewer". A diff viewer may display the differences between two files in a visual manner. It is typically used to show the changes between one version of a file and a former version of the same file. In accordance with the present embodiment, diff viewers may also plug-into presentation software. In such a case and in one particular embodiment single slides may be represented by a stack of slides ("thumbnails") whereas each slide may represent a particular version of the slide. As such, it may be easier for an end-user to see whether (and which) versions of a slide are being available, to inspect the difference and to flip between versions. One or multiple of these results may be selected (e.g., via a checkbox) and may then, be assembled in one single new deck.

Furthermore, the present embodiment may include an additional tool that may provide means to generate slide-decks ad hoc, as well as to define slide-decks as pure views on existing slides. According to one implementation, such a view may be presented to the user via a drag and drop interface, where the user may drag slides returned by a search (via an integration of the tool, previously described, that provides an aggregated view to the tag space) onto a canvas and then rearrange them. This view may then be saved via referencing the individual slides. Therefore, when the user is presenting, the view may be turned into a temporary presentation, that may also be used for distribution of the slides to students or customers. As such, the view concept may overcome the problem of multiple versions of one and the same slide, where updates or corrections may need to be applied throughout all versions. If a user does not desire such an ad-hoc generation of a presentation, an option according to one implementation, may be to generate the temporary presentation after the user has created "their" final version of the presentation.

Referring now to FIG. 1, an exemplary networked computer environment 100 in accordance with one embodiment is depicted. The networked computer environment 100 may include a computer 102 with a processor 104 and a data storage device 106 that is enabled to run a Presentation Material Manager and Assembler Program 108A. The networked computer environment 100 may also include a server 112 that is enabled to run a Presentation Material Manager and Assembler Program 108B and a communication network 110. The networked computer environment 100 may include a plurality of computers 102 and servers 112, only one of which is shown for illustrative brevity. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 8, server computer 112 may include internal components 800a and external components 900a, respectively and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing device capable of running a program and accessing a network.

A program, such as a Presentation Material Manager and Assembler Program 108A and 108B may have components running on the client computer 102 or on the server computer 112. The Presentation Material Manager and Assembler Program 108A, 108B may manage and dynamically assemble presentation material. The Presentation Material Manager and Assembler components (i.e., tools) and method are explained in further detail below with respect to FIGS. 2-7.

Figure 2:
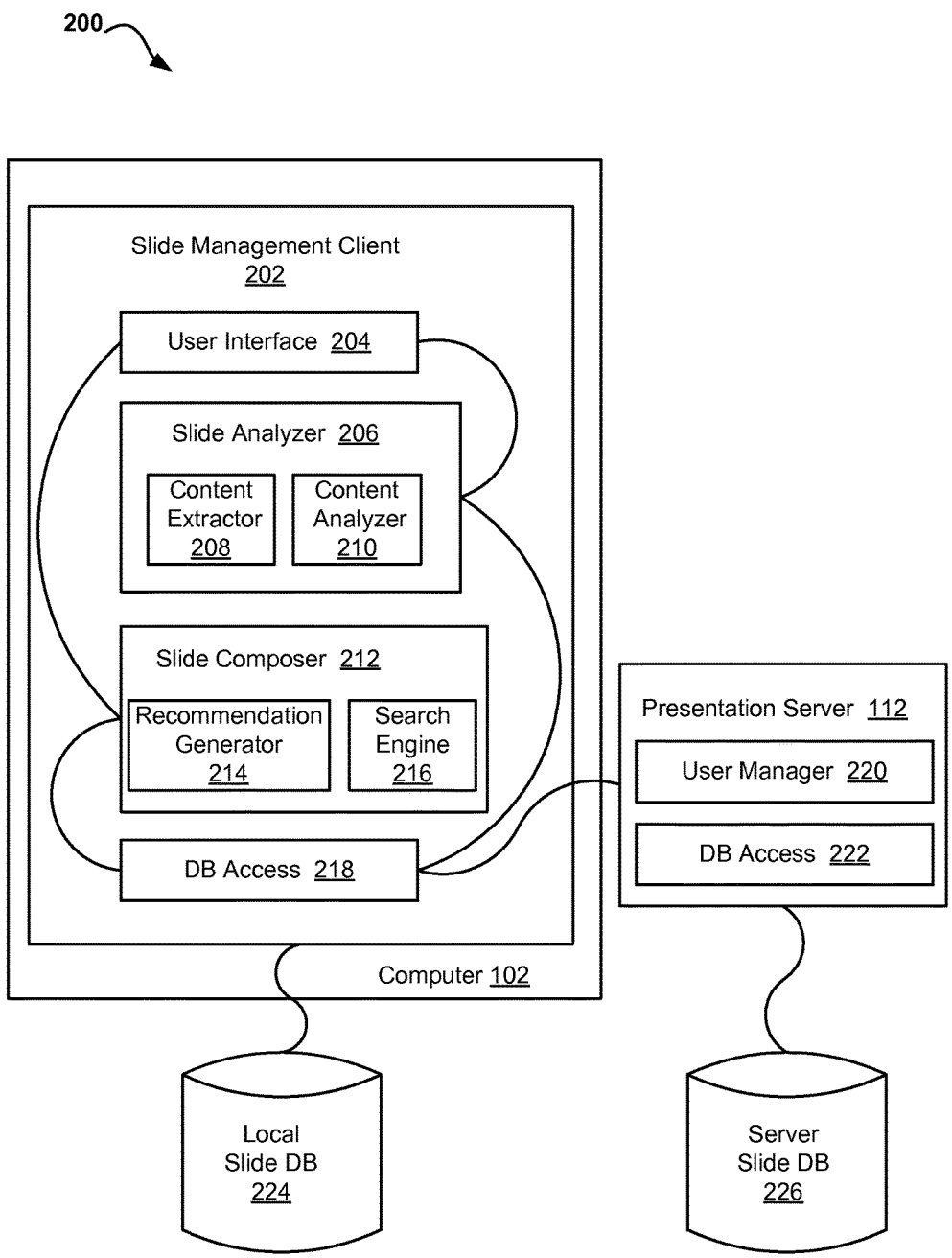
FIG. 2 illustrates the tools associated with a Presentation Material Manager Assembler Program running on a client computer and a server according to at least one embodiment.

FIG. 2, an illustration of the tools 200 associated with the Presentation Material Manager Assembler Program running on a client computer and a server in accordance with one embodiment is depicted. According to one implementation, the Presentation Material Manager Assembler Program 108A, running on a client computer 102, may include tools such as a Slide Management Client 202. The Slide Management Client may be implemented as an application that combines features, such as a User Interface 204; a Content Extractor 208; and a Content Analyzer 210. The User Interface 204 may upload slides; analyze slides; show recommendations for slides; and search and compose new decks. Additionally, a Presentation Server component 112 (described in further detail below) may provide the necessary central repository for sharing slides among employees. Furthermore, the Slide Analyzer component 206 may extract key content via the Content Extractor 208 from slides or slide-decks; analyze the content via the Content Analyzer component 210; and then provide tag suggestions and a list of similar slides or slide-decks. According to one implementation, the Slide Manager Client 202 may also be responsible for uploading slides to the local database (DB) 224 or the presentation server database (DB) 226, via a Database (DB) Access Component 218. Additionally, a Slide Composer component 212 may assemble new slide-decks by using an automatic Recommendation Generator 214 and/or a Search Engine 216.

According to at least one implementation, the Search Engine 216 may offer functionality to search slides based on metadata attached to slides or slide-decks earlier. To start with the searching process, the searching tool 216 may gather all tags and keywords from existing slides and decks, and present them to the end user, in a generated tag cloud. The user may then click on any tag in the tag cloud that would return and show a list of matching slides. In one implementation, this list may be presented to the end user as thumbnails for a better visual experience. Also, the search tool may show as a search result, all versions for each slide that has multiple versions. In one implementation, this search result containing multiple versions of a slide may be shown as a stack of slides. The present embodiment may also allow for the end user to plug-in any difference viewer tool to inspect the difference between versions of slides. As such, the user may leverage other specific purpose tools to further accomplish complementary tasks, such as flipping between versions and choosing one that is appropriate. Such an implementation may allow the user to select any number of such slides using check boxes. Then, these slides may be assembled into a new slide-deck. The new slide-decks may be defined as pure views on existing slides. As such, any changes done to the slides in this new deck may be persisted back to the original slides, as different versions.

Furthermore, the Slide Manager Client 202 may also include a Database (DB) Access component 218 to either access a Local Slide Database 224 or the Slide Database 226 (i.e., Server Slide (DB)) of the Presentation Server 112. As such, the Presentation Server component 112 may include a User Manager component 220 to manage user accounts on the server 112 via an external repository in accordance with one implementation. Additionally the Presentation Server component 112 may include a Database (DB) Access component 222 to manage access to the server slide Database (DB) 226.

Figure 3:
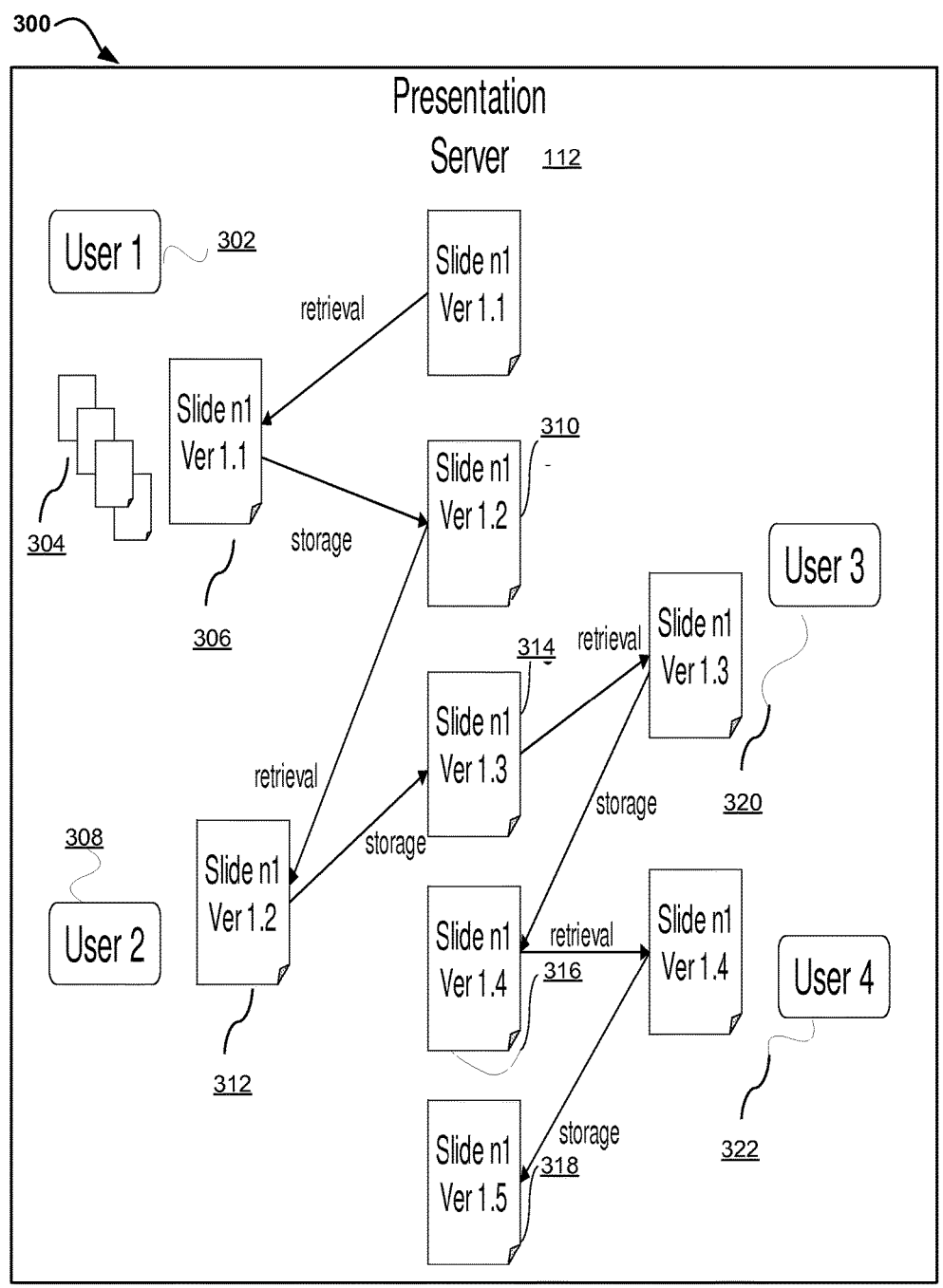
FIG. 3 illustrates an exemplary presentation server according to at least one embodiment.

Referring now to FIG. 3, an illustration of an exemplary presentation server 300 in accordance with one embodiment is depicted. According to at least one implementation of the present embodiment, the Presentation Material Manager and Assembler Program 108A and 108B may automatically assign versions to slides of presentations whenever the slides are modified by users for a new presentation via the presentation server 112. For example, a User 1 302 may currently modify a deck 304 which may be a compilation of views of slides stored on the Presentation Server 112. For illustration purposes only, a slide 306, numbered n1 and version 1.1 may be part of deck 304 from the Presentation Server 112. When User 1 302 is finished with modifications or editing to the slide, User 1 302 may store the slide back so changes may get reflected back to the Presentation Server 112. As such, this may result in the creation of version 1.2 of slide n1 310. Then, at a later point in time, User 2 308 may retrieve slide n1. As such, the Presentation Server 112 may give the latest version 1.2 of the slide 312 to User 2 308. Then, according to one implementation, when the changes are finished, the retrieved slide 312 may get stored to the server 112 so changes are reflected back to the server 112. As such, this may result in the creation of another version (e.g., version 1.3) of slide n1 314. Similarly, User 3 320 and User 4 322, may later end up retrieving and reflecting changes back to slide n1 that may result in the creation of (version 1.4) 316 and (version 1.5) 318.

Figure 4:
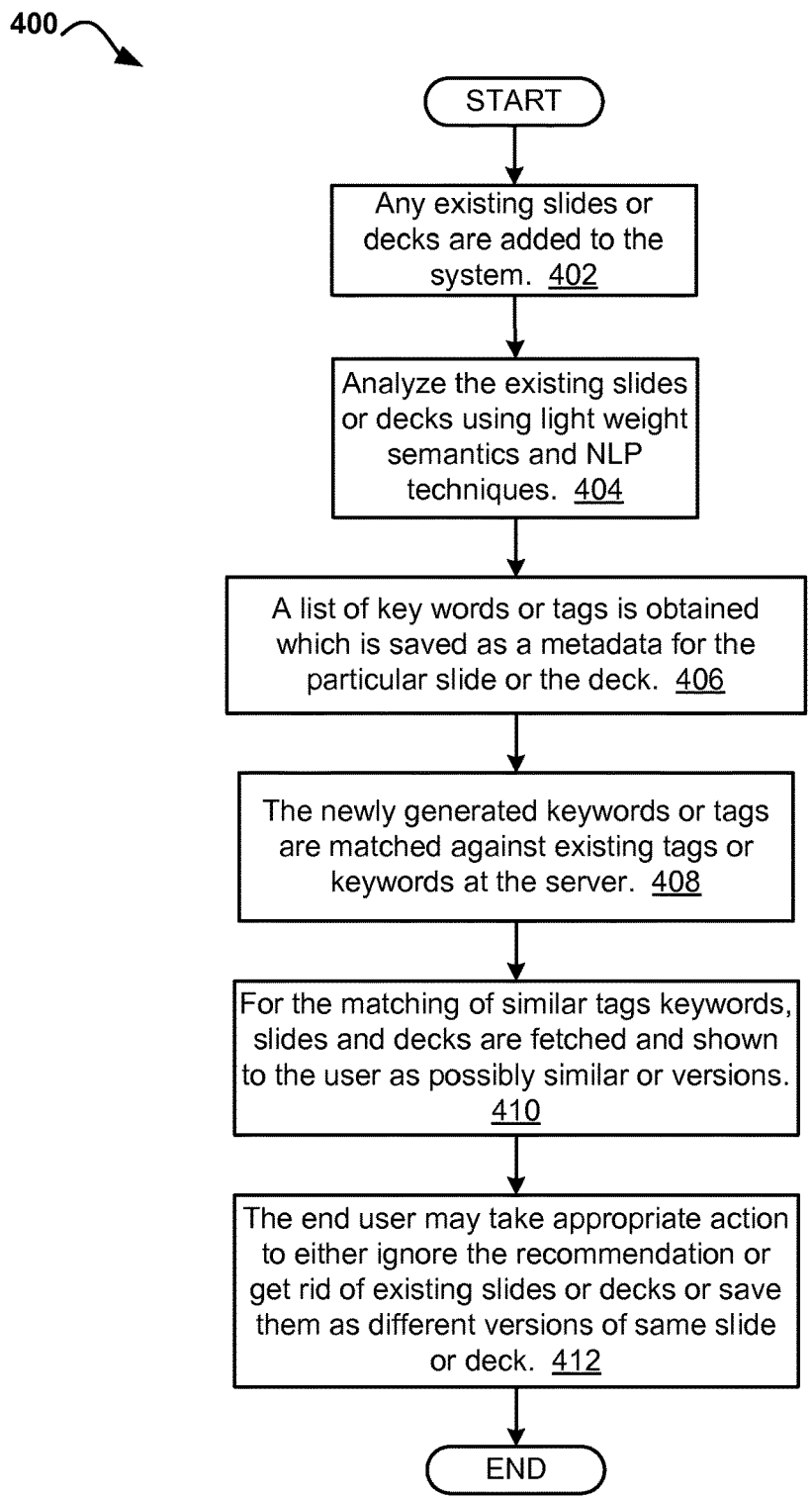
FIG. 4 is an operational flowchart illustrating the steps carried out by a program to analyze existing slides using natural language processing (NLP) techniques according to at least one embodiment.

Referring now to FIG. 4, an operational flowchart 400 illustrating the steps carried out by a program to analyze existing slides using natural language processing (NLP) techniques in accordance with one embodiment is depicted. According to one implementation, the present embodiment may automatically analyze slides via a Slide Analyzer 206 (FIG. 2) in one or more presentations using lightweight semantics and natural language processing (NLP) to tag the slides and recommend slides which may be considered related and may be versions of each other.

As such, at 402, any existing slides or decks may be added to the system. Therefore, the slides may be collected and assembled together in the system.

Then at 404, the existing slides or decks may be analyzed using light weight semantics and natural language processing (NLP) techniques. According to one implementation, such, analyzing of the slides may results in a list of keywords and tags.

Next at 406, a list of key words or tags may be obtained and saved as a metadata for the particular slide or deck. The obtained keywords and tags may be associated with both the slides and the decks to which the slides belonged to. Additionally, another key metadata that the present embodiment may utilize is that of slide versions that may be intelligently calculated.

Then at 408, the newly generated keywords or tags may be matched against existing tags or keywords at the server. As such, the newly generated keywords or tags may be matched against existing tags or keywords at the presentation server 112 (FIG. 2).

Next at 410, for the matching of similar tags or keywords, slides and decks may be fetched and shown to the user as possibly similar or versions of each other. As such, the end user may take appropriate action to either ignore the recommendation or get rid of existing slides or decks or save them as different versions of same slide or decks at 412. As a result, the present embodiment may find or calculate certain metadata and then utilize the same to drill down, discover and attach more metadata.

An example of the method described with respect to FIG. 4 may be as follows. According to one implementation, the present embodiment may put search results of slides in a particular logical order. As such, slides may be grouped based on tags. Therefore, all slides with the same tags may form a common section within a presentation. For example if a user searched for "portal", then the slides with tags "portal, security" may likely be found in a section on the WebSphere Portal Security and therefore, may be grouped together. In accordance with one implementation, sections may be put in any order. Furthermore, the position of slides in percentage or percentile may also be a metadata that may be used to position slides. For example, every slide may store as metadata, its position in its original deck in percentage terms. As such, this may also be used as an indicator to position the slide in the new deck formed at runtime. Therefore, the present embodiment may learn from existing decks to see what slides are always in a particular sequence. Then, if the user has an agenda slide, the present embodiment may use keywords from the agenda also to position slides using their tags. Furthermore, the present embodiment may use social media trends to bring forward interesting topics in the deck for further refining the position of the slides. According to at least one implementation, the user may be provided a visual tool to further and finally reorder the slides.

Figure 5:
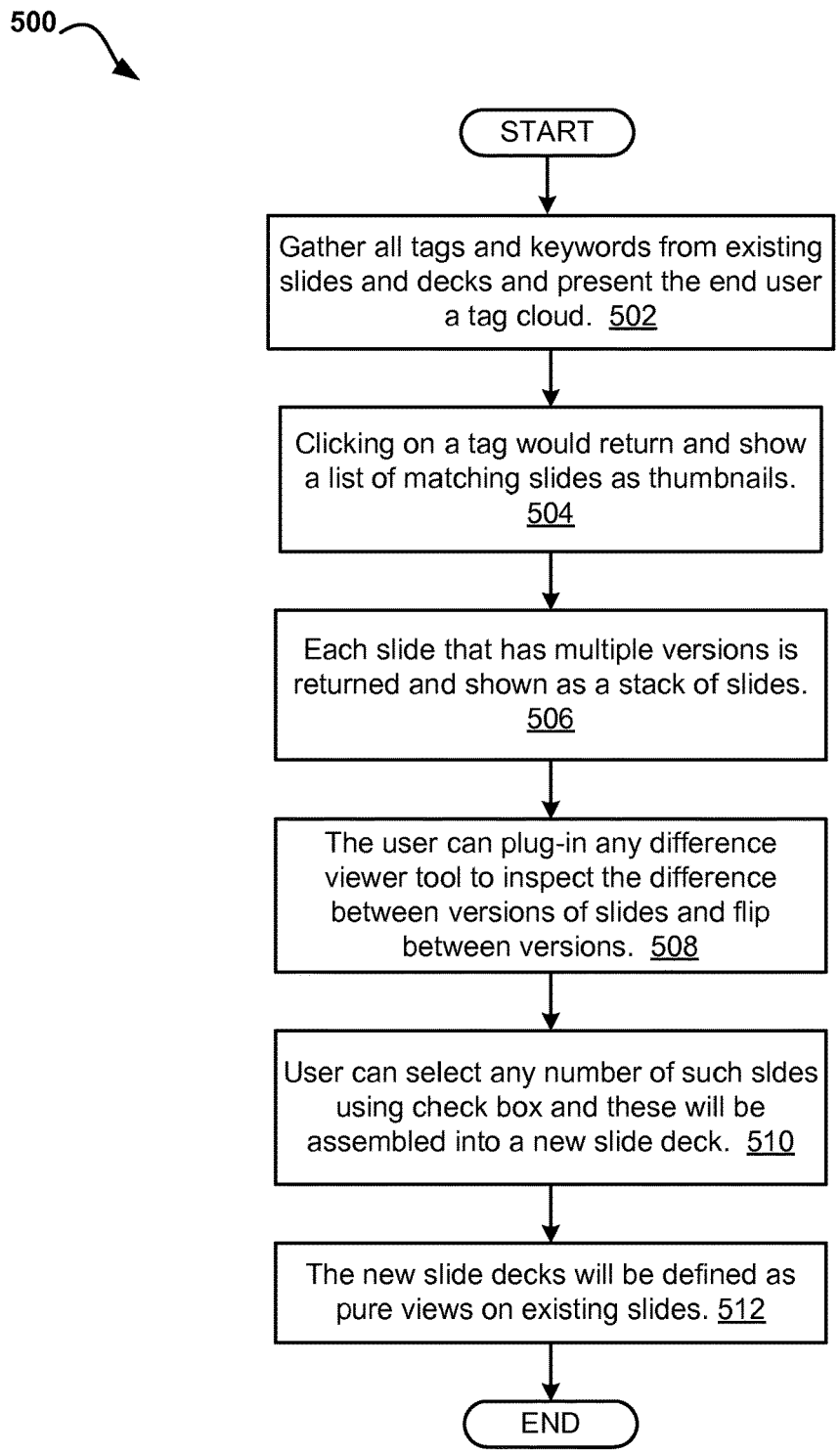
FIG. 5 is an operational flowchart illustrating the steps carried out by a program to search and assemble a new slide-deck according to at least one embodiment.

Referring now to FIG. 5, an operational flowchart 500 illustrating the steps carried out by a program to search and assemble a new slide-deck in accordance with one embodiment is depicted. In accordance with one implementation, a server, such as Presentation Server 112 (FIG. 2) may be provided that may maintain versions of tagged slides. Additionally, a tool, such as Slide Management Client 202 (FIG. 2) may be provided for searching through pool of slides (or slide-decks) and assembling a new slide-deck out of a set of slides.

At 502, all tags and keywords may be gathered from existing slides and decks and the end user may be presented with a tag cloud. Next at 504, clicking on a tag by a user may return and show a list of matching slides as thumbnails.

Then at 506, each slide that has multiple versions may be returned and shown as a stack of slides. Next at 508, the user may plug-in any difference viewer tool to inspect the difference between versions of the slides and flip between the versions.

Then at 510, a user may select any number of such slides using a check box and these slides may be assembled into a new slide-deck. Next at 512, the new slide-decks may be defined as pure views on existing slides.

Figure 6:
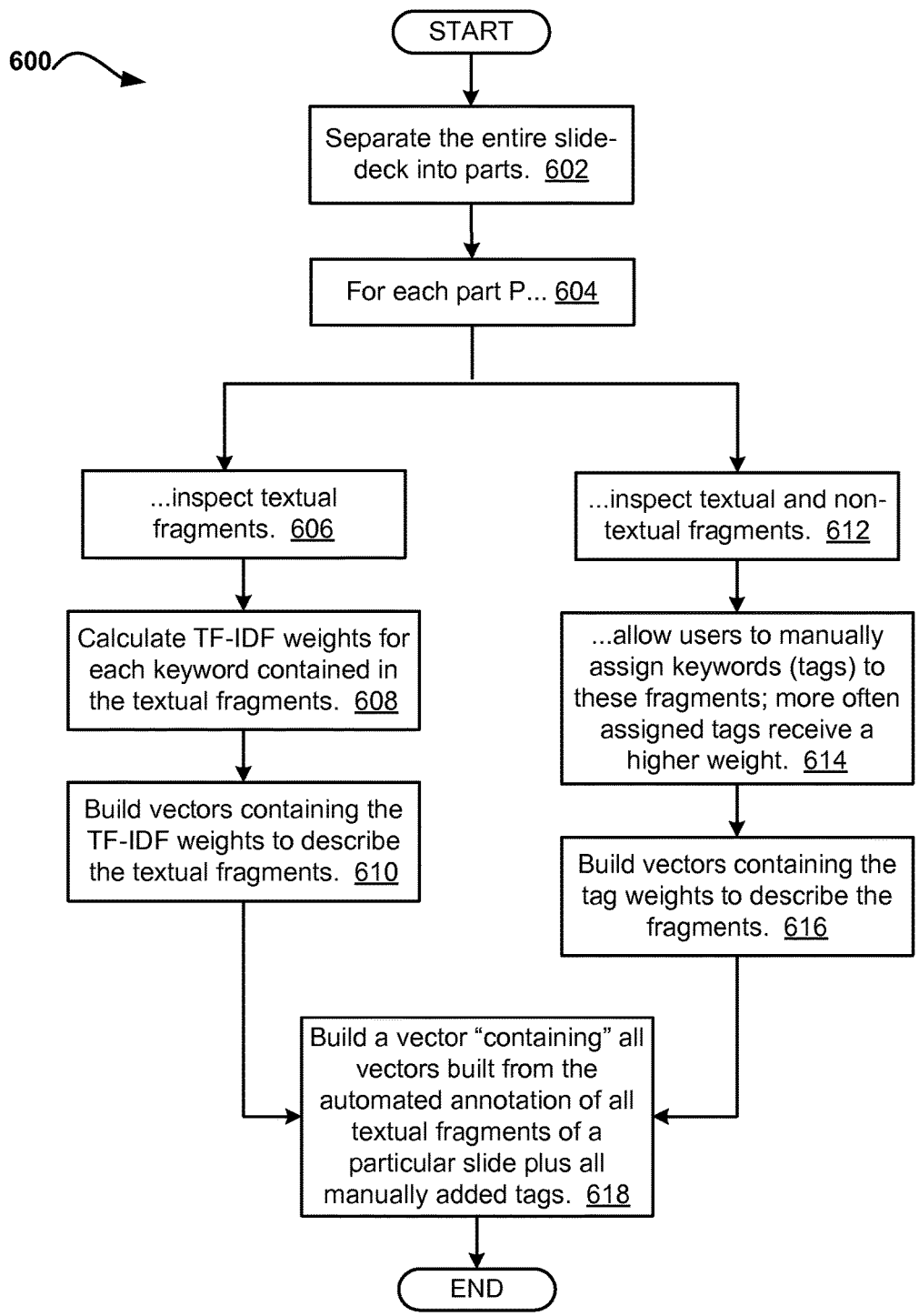
FIG. 6 is an operational flowchart illustrating the steps carried out by a program to enrich slides with metadata according to at least one embodiment.

Referring now to FIG. 6, an operational flowchart 600 illustrating the steps carried out by a program to enrich slides with metadata in accordance with one embodiment is depicted. According to the present embodiment, two different mechanisms may be used to semantically enrich or annotate slides and slide segments (e.g., =text segment part of a particular slide, drawings part of a slide, audio/video material part of a slide, etc.) The two different mechanisms may be implemented as automatic annotation and manual annotation. With respect to both the automatic annotation and the manual annotation, the method may begin at 602 by separating the entire slide-deck into parts. As such, a particular slidedeck may iteratively separated into parts (i.e., P). For example:

In iteration 1, a part can be a slide part of the slidedeck.
In iteration 2, a part can be a text segment, a drawing or multimedia material part of a slide.
In iteration 3, a part can be sentences or even single words part of text segments.
And so forth . . .

Next, at 604, for each part P, the method may perform different steps depending on whether automatic annotation is being implemented or manual annotation is being implemented.

As such, with respect to automatic annotation, the method may continue at 606 and inspect and analyze all textual fragments. Therefore, according to one implementation, texts describing items may be analyzed by standard information retrieval methods that provide means to determine the most important keywords describing the items. In accordance with one implementation, the importance of a keyword (over another) may be determined by some weighting measure.

As such, at 608, the method may calculate TF-IDF weights for each keyword contained in the textual fragments. One of the most popular weighting measures is the term frequency/inverse document frequency (TF-IDF) measure. For example:
Let k_i be some keyword and i_j some item.
Let f_i,j represent the number of times keyword k_i appears in i_j.
Then the term frequency TF_i,j of keyword k_i contained in the description of item i_j may be defined as follows:

$$TF_{i,j} = \frac{f_{i,j}}{\sum_k f_{k,j}},$$

Since keywords appearing in the description of many items are not useful for distinguishing between these, the inverse of the document frequency may become more important:
Let S_N denote the set and |S_N| the number of items that can potentially be recommended. Then the inverse document frequency may be defined as:

$$IDF_{i,j} = \log \frac{|S_N|}{|\{n \in S_N \mid \forall n : TF(i, j) \neq 0\}|}$$

Then, the TF-IDF weight of a keyword k_i for item i_j may be defined as:

$$w_{i,j} = TF_{i,j} \times IDF_{i,j}$$

and the vector describing the item i_j as:

$$content(i_j) = (w_{i,j}, \ldots, w_{k,j})$$

Then at 610, vectors containing the TF-IDF weights to describe the textual fragments may be built and at 618 the method may build a vector "containing" all vectors built from the automated annotation of all the textual fragments of a particular slide plus all the manually added tags (the manual annotation method is described in detail below). An example of the automated annotation method is as follows:
Consider a slide A with the following text:
"This is a sample."
TF values are:
This=1
is=1
a=1
sample=1
Consider a slide B with the following text:
This is another sample".
TF values are:
This=1
is =1
another=1
sample=1
And consider a slide C with the following text:
"This text is cool".

TF Values are:
This=1
text=1
is=1
cool=1
The vectors describing A, B, C with elements (this, is, a, another, sample, text, cool) are:
A=(1, 1, 1, 0, 1, 0, 0)
B=(1, 1, 0, 1, 1, 0, 0)
C=(1, 1, 0, 0, 0, 1, 1)
For each part mentioned above such describing vectors are being stored. When a particular slide is being edited the determination of similar slides is then just a question of finding slides with similar vectors. Similarity may be determined by applying typical similarity metrics for vectors, e.g. cosine similarity:

$$f_u(u_c, r_c) = \cos(\vec{w}_{u_c}, \vec{w}_{r_c})$$

With respect to the sample above A would be considered more similar to B than to C.
Thus when editing a slide A one would rather recommend to also consider having a look at B than C.

With respect to the manual annotation, at 612, textual and non-textual fragments may be inspected. Then at 614, users may be allowed to manually assign keywords (tags) to these fragments. As such, according to one implementation, the tags that are assigned more often may receive a higher weight. Next, at 616, vectors containing the tag weights to describe the fragments may be built. Then, as previously described above, at 618, the method may build a vector "containing" all vectors built from the automated annotation of all the textual fragments of a particular slide plus all the manually added tags.

Manual annotating may allow end users to manually apply keywords to the segments of a slide-deck (to slides, text, drawings, audio or video content). Since manually added tags may be more "expressive", their weight and thus relevance may be usually higher than the weight for automatically extracted keywords. Additionally, manual tags may not only be assigned to textual segments, but may also be assigned to multimedia content as well. Therefore, these tags become part of the describing vectors previously mentioned as well. As a result, the automatically extracted keywords may form, together with collaboratively added social tags, the vectors used to describe slides. As such, finding similar or relevant slides may then encompass finding slides with similar vectors.

Figure 7:
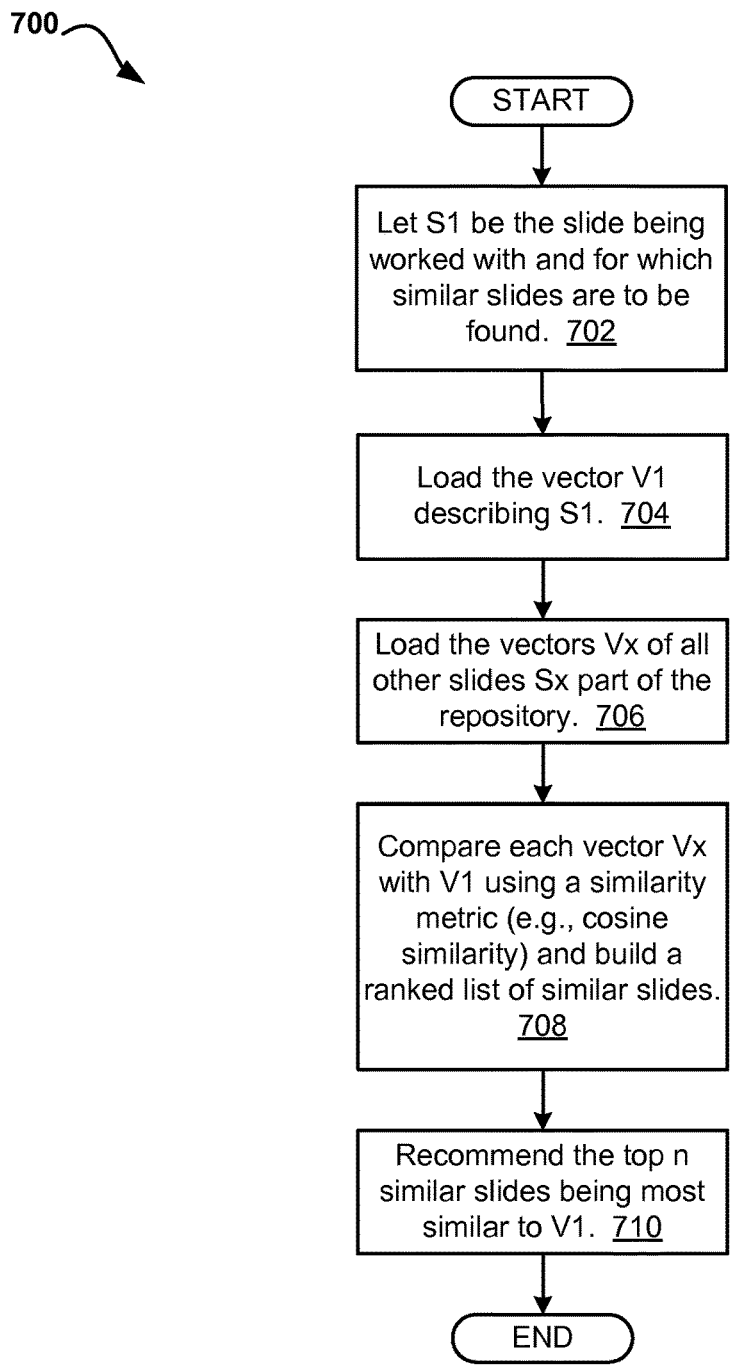
FIG. 7 is an operational flowchart illustrating the steps carried out by a program to search for similar slides according to at least one embodiment.

Referring now to FIG. 7, an operational flowchart 700 illustrating the steps carried out by a program to search for similar slides in accordance with one embodiment is depicted. At 702, S1 may be defined as the slide being worked with and for which similar slides are to be found. Then at 704, the vector V1 may be loaded describing S1.

Next at 706, the vectors Vx of all other slides Sx part of the repository may be loaded. Then at 708, each vector Vx may be compared with V1 using a similarity metric, such as cosine similarity and a ranked list of similar slides may be built. Next, at 710, the top n similar slides being most similar to V1 may be recommended.

According to alternate implementations, finding similar or relevant slides may include the use of other mechanisms, such as not only the pure content may be analyzed, but also all users' behavior when assembling slides. For example, a user may remember information about which slides are often used in conjunction etc. or which slide is often added to a particular other slide. Additionally, recommendations may also be based on the quality of slides once rating tools are being added to the system.

It may be appreciated that FIGS. 4-7 provide only an illustration of one implementation and does not imply any limitations with regard to how different embodiments may be implemented. Many modifications to the depicted environments may be made based on design and implementation requirements. For example, the entire system may also differentiate between layout and content. For example, slides may have a different (visual) layout, however, the slides may have the same (i.e., semantical) content (e.g., "text"). In such a case, the slide may exist in a particular version which may exist in different "facets" as these could be considered semantically equivalent. For example, a slide may exist in different languages and be semantically equivalent, such as existing in English and German (i.e., another facet of the same version of the slides). Additionally, the present embodiment may also facilitate rating capabilities in order to rate slide-decks, such as slides rated higher may indicate the slides are being used more often. Therefore, "better" slides may be easier to locate based on the popularity of that slide being chosen more often than other slides.

Furthermore, as previously mentioned, multiple users may choose to contribute their slides and slide-decks to a system repository, such as the Server Slide Database (DB) 226 (FIG. 2). These slides and slide-decks may then analyzed by the system, as explained above, to generate and attach metadata to the slides and slide-decks. Cooperation and sharing between users may begin again when such existing users, at a later point in time, come back to the system, with some search key words, looking for specific slides or slide-decks. They then, either selected a few slides, or generated entire slide-decks, as outlined above and further use it for their purpose. These users may then customize these slides for their specific purpose. As explained above, these changes may be persisted back to original slides and saved as multiple version of same slide. Thus, these users not only use the system to find slides or decks but they also play an important part of generating new content for the system that further increases the content repository data. The cooperation among users may not necessarily start with contributing slides to the system. According to at least one implementation, the system may allow new users to come and request access to content (slides or decks) right away, depending on search tags or keywords. The rest of the dynamics of the present embodiment as previously described may remain the same and may lead to an interdependent ecosystem that both aids in the sharing of content and content generation.

Figure 8:
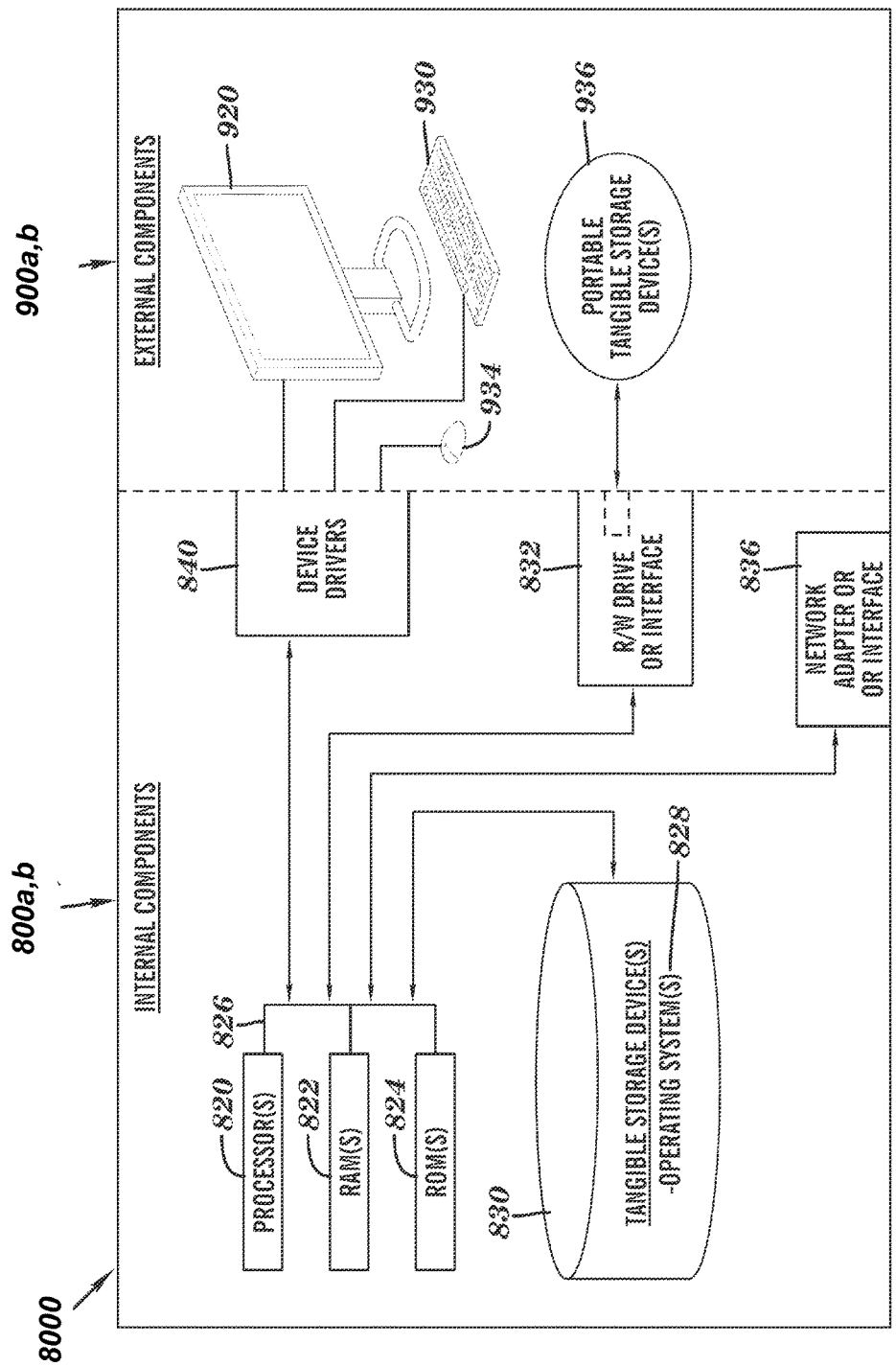
FIG. 8 is a block diagram of internal and external components of computers and servers depicted in FIG. 1 according to at least one embodiment.

FIG. 8 is a block diagram 8000 of internal and external components of computers depicted in FIG. 1 in accordance with an illustrative embodiment of the present invention. It should be appreciated that FIG. 8 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) may include respective sets of internal components 800 *a, b* and external components 900 *a, b* illustrated in FIG. 8. Each of the sets of internal components 800 *a, b* includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and Presentation Material Manager and Assembler Program 108A (FIG. 1) in client computer 102 (FIG. 1) and Presentation Material Manager and Assembler Program 108B (FIG. 1) in network server computer 112 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 8, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 *a, b*, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as Presentation Material Manager and Assembler Program 108A (FIG. 1) and 108B (FIG. 1), can be stored on one or more of the respective portable computer-readable tangible storage devices 936, read via the respective R/W drive or interface 832 and loaded into the respective hard drive 830.

Each set of internal components 800 *a, b* also includes network adapters or interfaces 836 such as a TCP/IP adapter cards, wireless Wi-Fi interface cards, or 3G or 4G wireless interface cards or other wired or wireless communication links. The Presentation Material Manager and Assembler Program 108A (FIG. 1) in client computer 102 (FIG. 1) and Presentation Material Manager and Assembler Program 108B (FIG. 1) in network server 112 (FIG. 1) can be downloaded to client computer 102 (FIG. 1) from an external computer via a network (for example, the Internet, a local area network or other, wide area network) and respective network adapters or interfaces 836. From the network adapters or interfaces 836, the Presentation Material Manager and Assembler Program 108A (FIG. 1) in client computer 102 (FIG. 1) and the Presentation Material Manager and Assembler Program 108B (FIG. 1) in network server computer 112 (FIG. 1) are loaded into the respective hard drive 830. The network may comprise copper wires, optical fibers, wireless transmission, routers, firewalls, switches, gateway computers and/or edge servers.

Each of the sets of external components 900 *a, b* can include a computer display monitor 920, a keyboard 930, and a computer mouse 934. External components 900 *a, b* can also include touch screens, virtual keyboards, touch pads, pointing devices, and other human interface devices. Each of the sets of internal components 800 *a, b* also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for automatically managing a plurality of slides associated with a slide-deck, the method comprising:
   adding the plurality of slides to a computing system;
   analyzing, by a slide analyzer, at least one slide within the plurality of slides;
   rating the analyzed at least one slide within the plurality of slides, wherein the rating comprises assigning a numerical number as metadata based on a frequency in which the analyzed at least one slide has previously been selected, and wherein the assigned numerical number indicates a quality associated with the analyzed at least one slide based on the frequency in which the analyzed at least one slide has previously been selected;
   generating, by the slide analyzer, a list comprising of at least one key word or at least one tag based on the analyzing of the at least one slide within the plurality of slides, wherein the generated list is associated with the at least one slide or at least one slide-deck;
   matching, by a slide composer, the at least one key word or the at least one tag against at least one key word or at least one tag saved on a presentation server, wherein a plurality of different versions of annotated slides are maintained in a presentation server database stored on the presentation server and can be accessed by a community of users;
   fetching, by a search engine, at least one slide or at least one slide-deck from the presentation server based on the matching, wherein the fetching comprises gathering a plurality of tags and a plurality of keywords from a plurality of existing slides and a plurality of existing slide-decks, and wherein the gathered plurality of tags and the gathered plurality of key words are presented via a user interface as a generated tag cloud;
   in response to detecting a click on a tag in the generated tag cloud, displaying, by a recommendation generator, the at least one fetched slide or the at least one fetched slide-deck on the user interface, wherein the at least one fetched slide or the at least one fetched slide-deck is associated with the tag that was clicked, wherein the displaying the at least one fetched slide-deck comprises displaying a plurality of different versions of a single slide as a stack of thumbnail slides, and wherein each slide in the stack of thumbnail slides represents a particular version of the displayed at least one slide and is displayed with a corresponding checkbox to be marked for selection;
   in response to detecting a plurality of single slides within the displayed stack of thumbnail slides being selected via the corresponding checkbox, assembling the selected plurality of single slides into one single new deck;
   displaying the one single new deck via the user interface; and
   in response to detecting a change via the user interface to at least one displayed slide within the displayed one single new deck, automatically uploading the at least one changed displayed slide to the presentation server database stored on the presentation server, wherein the uploaded at least one changed displayed slide is saved as a multiple version of the at least one displayed slide.

2. The method of claim 1, wherein the analyzing of the plurality of slides comprises the use of light weight semantics and natural language processing (NLP) techniques.

3. The method of claim 1, wherein the generated list is saved as metadata associated with the at least one slide within the plurality of slides.

4. The method of claim 1, wherein the fetched at least one slide or the fetched at least one slide-deck is displayed on the user interface as at least one of a suggested similar slide, a suggested similar slide-deck, a suggested similar version slide, and a suggested similar version slide-deck.

5. The method of claim 1, wherein the displaying of the at least one fetched slide or the at least one fetched slide-deck on a user interface comprises the use of a difference viewer tool to compare the at least one fetched slide to at least one other fetched slide or compare the at least one fetched slide-deck to at least one other fetched slide-deck.

* * * * *